TELEPHONE SIGNALLING CIRCUITS

Filed Jan. 17, 1963

2 Sheets-Sheet 1

INVENTOR.
EDWARD H. LANHAM

Robert B. Harmon
ATTORNEY

Feb. 15, 1966 E. H. LANHAM 3,235,669

TELEPHONE SIGNALLING CIRCUITS

Filed Jan. 17, 1963 2 Sheets-Sheet 2

INVENTOR.
EDWARD H. LANHAM

Robert B. Harmon
ATTORNEY 3,235,669

TELEPHONE SIGNALLING CIRCUITS

Edward Herbert Lanham, Ottawa, Ontario, Canada, assignor to Northern Electric Company, Limited, Montreal, Quebec, Canada, a corporation of Canada Filed Jan. 17, 1963, Ser. No. 252,165
17 Claims. (Cl. 179—84)

This invention relates to telephone signalling circuits and particularly to circuits for two-way repeating and controlling voice and supervisory signals of either an alternating or direct current nature.

In the past, dial long line repeaters and inter-office trunks of the aforementioned type have required the use of electromagnetic relays to enable these circuits to receive alternating current ringing signals and to cause these received signals to effect the application of similar alternating current ringing signals, derived from a local generator, to the telephone line to the subscriber's station or distant central office. The use of electromagnetic relays in telephone long line and inter-office trunk circuits of the aforementioned types is objectionable in that such relays are by comparison large and heavy, require excessive operating power and continuous maintenance to keep them in efficient operating condition.

It is an object of this invention to provide a two-way transistorized signal repeater to repeat and control signals of either direct or alternating current nature.

Another object of this invention is to provide a two-way repeater circuit having the foregoing properties with means to eliminate the need for using electromagnetic relays.

A further object of this invention is to provide a dial telephone long line repeater and dial telephone inter-office trunk whereby the dial impulses are received from a subscriber's station at a central office, to establish a switching connection and to originate ringing supervisory signals, and thereafter to repeat and amplify these signals under control of the central office.

It is a further object of this invention to provide means for eliminating the need for using electromagnetic relays for repeating alternating current ringing signals to subscriber lines and central office trunks of the well-known bridged ringing type wherein the station ringer or ringing signal receiving relay at the distant central office is bridged or connected across the incoming telephone line.

Another object of this invention is to eliminate the need for using electromagnetic relays for repeating alternating current ringing signals to subscribers' telephone lines of the divided ringing party line type wherein a group of subscriber's stations are connected across the telephone line for talking purposes, but wherein for the purpose of signaling, such group is divided into two groups; one of which has the station ringers connected from the tip side of the line to ground, while the other has the station ringers connected from the ring side of the line to ground.

These and other objects are obtained, in one embodiment of the invention by providing a two-way repeater circuit responsive to alternating current supervisory signals received from a central office for transmission to a subscriber's station, arranged for divided or bridge type of operation. The two-way repeater includes a plurality of transistor circuits controlled by light dependent resistors responsive to light rays emitted from lamps controlled by ringing signals transmitted from the calling C.O. and which are capable of switching the talking battery off and applying ringing potential to conform to divided ringing as required.

A better understanding may be had by referring to the following description, taken in conjunction with the drawings, in which.

Figures 1, 1A:
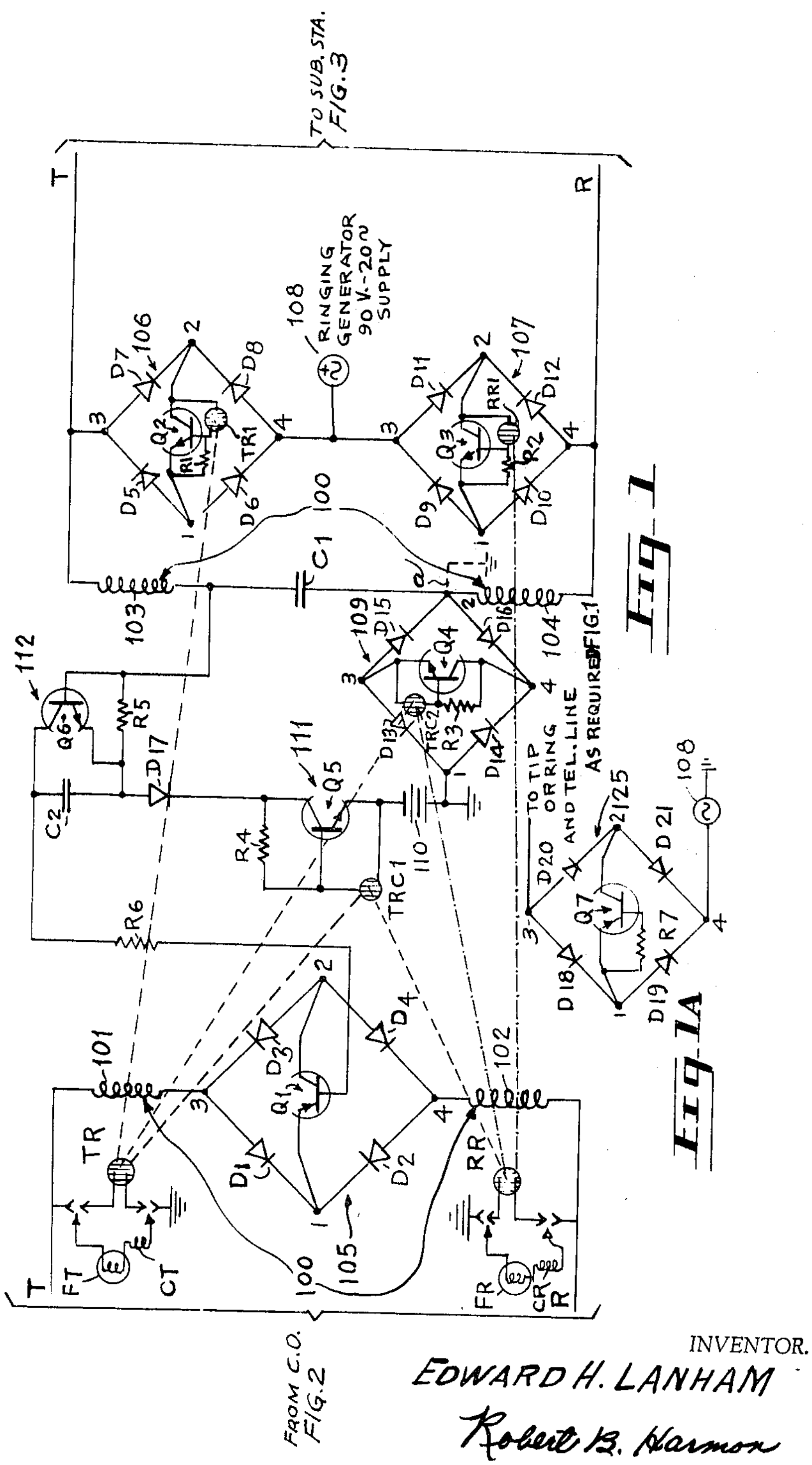
FIG. 1 illustrates a circuit schematic of the two-way repeater circuit of the invention.
FIG. 1A illustrates a circuit schematic of a light responsive transistor employed in one embodiment of the invention.

Considering the drawings, there is shown in FIG. 1 repeating coil 100 having windings 101, 102 and 103, 104, with a coupling capacitor C1 connected to the inner ends of windings 103, 104, the outer ends of windings 101, 102 and 103, 104 being connected to the tip and ring side of the central office and subscriber's loop respectively.

Also shown is the discharge and filament lamps RR, TR, and FT, FR respectively, one side being individually connected to the ring and tip side of the transmission line and the other side to ground. Connected to the filament lamps FT, FR is a choke coil CT and CR respectively.

Also shown in FIG. 1 is a first four arm full wave rectifier bridge circuit 105 composed of a first, second and a third, fourth diode, D1, D2, and D3, D4 respectively, diodes D1, D2 and D3 and D4 being joined together to form a first and second junction point respectively, the outer ends of diodes D1, D3 and D2, D4 being joined together to form a third and fourth junction point respectively.

Included in the bridge circuit 105 is the p-n-p transistor Q1 having the emitter and collector electrodes connected to the first and second junction point. The third and fourth junction points of the bridge circuit 105 are connected to the inner ends of the windings 101, 102 respectively.

Also shown in FIG. 1, is the second and third four arm full wave rectifier circuits 106, 107 respectively composed of a first, second and a third, fourth diode D5, D6 and D7, D8 with respect to bridge circuit 106 and diodes D9, D10 and D11, D12 with respect to bridge circuit 107. Diodes D5, D6 and D7, D8 and D9, D10 and D11, D12 are joined together to form individually a first and second junction point respectively while the outer ends of diodes D5, D7 and D6, D8 and D9, D11 and D10, D12 are joined together to form individually a third and fourth junction point respectively.

Included individually in the bridge circuits 106, 107 is the n-p-n transistors Q2, Q3 having the emitter and collector electrodes connected to the first and second junction points, resistors R1, R2 connected to the base and emitter electrodes and light responsive resistors TR1, RR1 connected to the base and collector electrodes respectively.

Connected to the junction point of a third and fourth junction point of bridge circuits 106, 107 is the ringing source 108 the other third and fourth junction points of such circuits being connected to the tip and ring side of the subscriber's loop respectively.

Shown in FIG. 1 is a fourth full wave four arm circuit 109 composed of diodes D13, D14 and D15, D16 joined together to form a first and second junction point respectively, the outer ends of diodes D13, D14 and D15, D16 being joined together to form a third and fourth junction point respectively.

Included in bridge circuit 109 is n-p-n transistor Q4 having the emitter and collector electrodes connected to the third and fourth junction point respectively. Contained in this bridge circuit 109 is the resistor R3 connected to the base electrode and the collector electrode connected to the base and emitter electrodes and light responsive resistor TRC2 connected between base and emitter electrodes. The second junction point of this bridge circuit 109 is connected to the junction point between the coupling capacitor C1 and the inner end of its winding 104 of the repeater coil 100.

Also shown in FIG. 1 is the grounded energy source 110 with the ground connected to the first junction point of the bridge circuit 109.

Shown in FIG. 1, is a fifth transistor circuit 111 including a resistor R4 connected to base and collector electrodes and light responsive resistor TRC1 connected to the base and emitter electrodes. The emitter electrode of the circuit is connected to the direct current energy source 110 and the collector through diode D17 and resistor R5 to the junction point between the inner end of winding 103 and the coupling capacitor C1.

In addition there is included in the circuit shown in FIG. 1 a sixth transistor circuit 112 consisting of transistor n-p-n Q6 having the emitter electrode connected to the diode D17 and the collector electrode to the base electrode of transistor Q1 through resistor R6. Shunted across the collector and emitter electrode of transistor Q6 is the by-pass capacitor C2. Transistors Q1 and Q2, Q3, Q4, Q5, Q6 are complementary to each other and together form a supervisory circuit for tipping, ringing and signalling.

Figure 2:
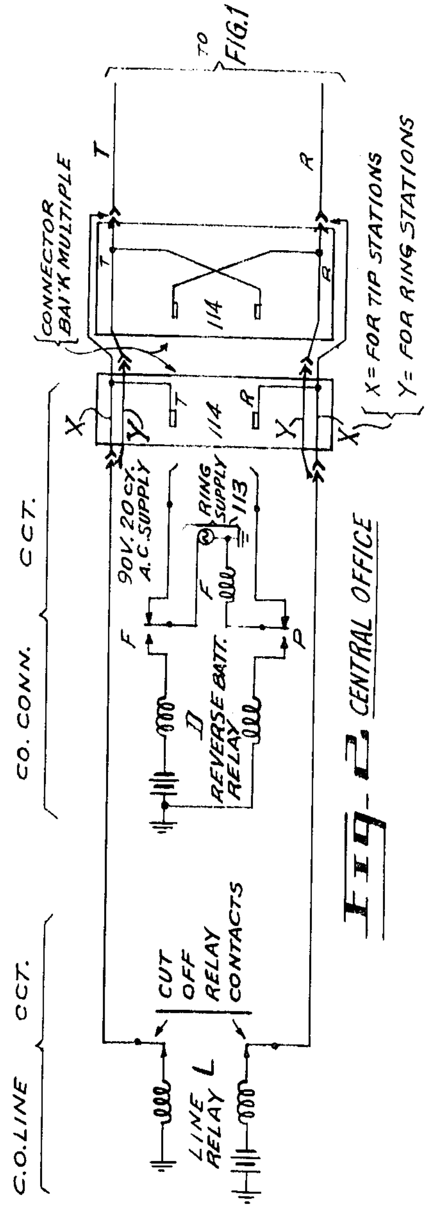
FIG. 2 illustrates a circuit schematic of a typical central office showing only those elements required for the description of the invention.

Consider FIG. 2, which illustrates part of the equipment located in a central office, there is shown line relay L, ringing supply 113, such as 90 volts, 20 cycle alternating current, ringing trip relay F, reverse battery relay D, connector bank 114.

Figure 3:
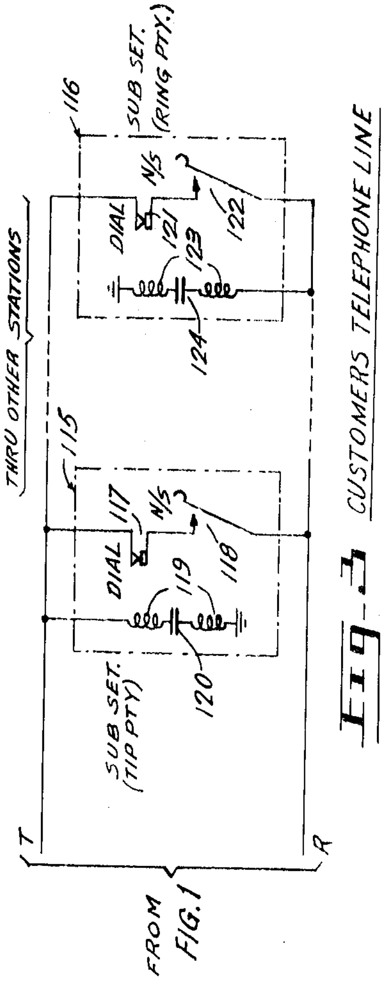
FIG. 3 illustrates a circuit schematic of a typical arrangement of a plurality of subscribers' stations, two being shown, arranged for divided ringing transmission illustrating only the apparatus required for the description of the invention.

In FIG. 3 there is shown two of a plurality of subscriber's stations 115, 116 each including dial contacts, switchhook contacts, ringer coils and blocking-pass capacitors 117, 118, 119, 120 and 121, 122, 123, 124, respectively.

In FIG. 1A, there is shown a light responsive transistor circuit 125 consisting of full wave rectifier circuits consisting of diodes D18, D19 and D20, D21 joined together and a transistor Q7, the emitter and collector electrodes being connected to the junction points of the diodes D18, D20 and D19, D21 respectively. A biasing resistor R7 is connected to the base and emitter electrodes.

The light responsive resistors TRC1, TRC2, TR1, RR1 are contained in a baffled light container so arranged that light responsive resistors TRC1, TRC2 will respond to either lamp RR or TR while TR1 and RR1 will respond only to lamp TR or RR respectively.

Light dependent resistors TRC1, TRC2, TR1 and RR1 may be those described in Phillips Electronic Industries Ltd. bulletin entitled "Light Sensitive Devices." The light responsive transistors may be those described in General Electric Company's bulletin entitled "Development," November 1, 1961.

The following are representative values, of the indicated elements, which may be employed in the invention:

| | | |
|---|---|---|
| Capacitors: | | |
| C1 | mf | .5 |
| C2 | mf | .05 |
| Resistors: | | |
| R2 | | 3500Ω |
| R3 | | 90Ω |
| R4 | | 45Ω |
| R5 | | 90Ω |
| R6 | | 350Ω |
| R7 | | 50,000Ω |

*Operation*

In the operation of the repeating circuit of the invention, the signalling talking circuit disclosed in Canadian Patent Ser. No. 677,734 issued January 7, 1964 to P. J. Read, may be employed in this invention with respect to direct current supervisory and dialling signals transmitted to the central office, illustrated in FIG. 2 of this invention and to the subscribers' stations illustrated in FIG. 3 of this invention.

The functions of the transistor circuits employed in the invention are as follows, their state in the quiescent condition of the circuit being as indicated:

Q1 (cut-off)—normally presents an on-hook or open circuit condition to the central office equipment. Changes to an off-hook or closed circuit condition depending upon the open or closed (on- or off-hook) condition of Q5, FIG. 1.

Q2 (cut-off)—operates to apply 20 cycle ringing potential to the tip side of the line to operate the station ringers connected from the tip side to ground, FIG. 3.

Q3 (cut-off)—operates to apply 20 cycle ringing potential to the ring side of the line to operate the station ringers connected from the ring side to ground, FIG. 3.

Q4 (turned on)—operates to remove the ground from the ring side of the line, when ringing ring side station bells, to prevent short circuiting the station bells.

Q5 (turned on)—operates to open the talking battery circuit during the transmission of ringing signals.

Q6 (cut-off) operates as a switch to control Q1 in response to an on-hook (open circuit) or off-hook (closed circuit) condition of the subscribers' station switchhook or dial contacts.

Q7 (cut-off)—same as Q2 or Q3.

When the subscriber at the calling subscrber's station lifts the receiver, the line relay "L," FIG. 2, operates so that a line finder is seized which finds the calling line desiring service. At the central office, the subscriber's line, FIG. 3, is also provided with a connector bank 114 representative of the subscriber's line. For the opposite direction, when a central office subscriber calling a multi-party station, FIG. 3, is connected to the connector bank 114, the ringing source 113, which may be 90 volts, 20 cycle source superimposed on a direct current tripping battery, is applied to the ring or tip conductors of the transmission line.

Assume now that a call is to be extended from the central office to a customer whose station ringer is connected from the ring side of the telephone line to ground, FIG. 3.

*Ringing on the ring side*

In this case, the central office equipment, FIG. 2, will connect signalling potential 113 to the ring conductor of the central office loop via connector bank 114. The high signalling potential will be impressed across the lamp RR, FIG. 1, which may be of the well known "neon" type. The signalling potential is of sufficient magnitude to cause the lamp to break down and conduct thereby emitting light from its electrodes. Light responsive resistors RR1, TRC1 and TRC2, transistor circuits 111, 109, being located in close physical proximity to the lamp RR, are bombarded by the radiation therefrom and in consequence, their resistance falls from a very high value to a relatively very low value.

In consequence of light dependent resistors TRC1 and TRC2, transistor circuits 111, 109, falling to a low resistance value, transistors Q5 and Q4 will switch from the "on" to the "off" or high resistance condition. Transistor Q5 turned off will open the talking battery 110 connection to the tip of the telephone line through diode D17, resistor R5 and repeating coil winding 103. Transistor Q4 turned off will open the ground connection to repeating coil winding 104.

In consequence of light responsive resistor RR1, transistor bridge circuit 107, falling to a low resistance value, as previously described, transistor Q3 will switch from the "off" to the "on" or conducting condition. The closure of transistor Q3 will complete a circuit for the application of ringing potential to the ring side of the telephone line, FIG. 1, thus causing the operation of all station ringers connected therefrom to ground, FIG. 3. Diodes D9, D10, D11, D12, FIG. 1, connected in the circuit with transistor Q3 form a full wave rectifier which maintains negative potential on the emitter and positive potential on the collector of transistor Q3 regardless of the polarity of the alternating current ringing potential.

When the central office ringing signal ceases, lamp RR, FIG. 1, is extinguished, light responsive resistors TRC1, TRC2 and RR1 will revert to their very high resistance condition. In consequence of RR1 reverting to the high resistance condition, transistor Q3 will switch to the "off" condition, thus disconnecting ringing potential from the telephone line. In consequence of TRC1 and TRC2 reverting to the high resistance condition, transistors Q5 and Q4 will switch to the "on" condition, thus reconnecting transmission battery and ground to the telephone line.

When the called customer's station goes off-hook, FIG. 3, a circuit, FIG. 1, will be closed during the silent period from energy source 110 through closed transistor Q5, diode D17, resistor R5 over the tip side of the telephone line and customer's telephone set, FIG. 2, through repeating coil winding 104, rectifier bridge circuit 109 to ground. In consequence of the closure of this circuit, the potential appearing across resistance R5, FIG. 1, will cause transistor Q6 to switch to the "on" condition in turn causing transistor Q1 to turn on and close a direct current loop to central office. This closure can be traced from ringing supply ground 113, FIG. 2, winding of relay F, back contact of relay F, connector wiper and bank contact 114 to tip side of central office trunk, FIG. 1, through repeating coil winding 102, diode bridge 105, repeating coil winding 101, ring side of central office trunk, bank contacts 114, connector wiper, back contact of relay F to 20 cycle ringing supply 113. The closure of this direct current loop will cause the central office equipment to trip ringing and to revert to the talking condition.

*Ringing tip side stations*

When the central office equipment applies ringing potential to the tip side of the central office trunk, instead of to the ring side, lamp TR will light, FIG. 1, instead of lamp RR and in consequence, light responsive resistor TR1, transistor bridge circuit 106, will revert to its low resistance condition instead of light responsive resistor RR1. This results in ringing potential being applied to the tip side of the telephone line through transistor Q2 instead of to the ring side through transistor Q3 as described previously. Light responsive resistors TRC1 and TRC2, transistor bridge circuits 111, 109, will also be activated by the lighting of lamp TR as they were when lamp RR was lighted. It should be explained here that light responsive resistors TR1, RR1, TRC1 and TRC2 are so disposed in a baffled, light tight container, together with lamps TR and RR, that resistors TRC1 and TRC2 will respond to the lighting of either lamp whereas TR1 and RR1 will respond only to lighting of lamp TR or RR respectively.

In the case of customer's lines having bridged station ringers, the rectifier bridge circuit 109, FIG. 1, is omitted from the circuit and point "*a*" of repeating coil winding 104 is connected directly to ground. The central office in this case applies signalling potential to the tip of the central office trunk. The impedance of coupling capacitor C1, FIG. 1, is too high to present any appreciable loss to the ringing potential.

Assume now that a station on the telephone line originates a call towards the central office. When the station goes off-hook, a direct current circuit is closed from energy source 110, FIG. 1, through diode D17, transistor Q5, resistor R5, winding 103 of repeating coil 100 over the tip conductor of the telephone line through the calling telephone set, FIG. 3, over the ring conductor of the telephone line, FIG. 2, winding 104 of repeating coil 100, FIG. 1, through rectifier bridge circuit 109 to ground. Transistors Q5 and Q4 are in the "on" condition at all times except during a central office ringing period.

As previously explained, in consequence of the closure of this direct current circuit, the potential appearing across resistor R5 will cause transistor Q6, which is complementary to transistor Q1, to switch to the "on" condition in turn causing transistor Q1 to turn on and close a direct current loop to the central office equipment as previously described. When the calling station dial, FIG. 3, is operated opening and closing the loop over the telephone line, the potential across resistor R5 will disappear and reappear with each opening and closing of the loop in turn causing transistor Q6 to open and close and consequently, causing transistor Q1 to open and close the pulsing loop over the central office trunk conductors to actuate the central office equipment.

If the central office equipment is arranged to reverse the battery towards the calling station, the rectifier bridge circuit 105 ensures that the emitter of transisor Q1 will always be conneced towards positive potential and the collector towards negative potential. When the calling station, FIG. 3, goes on hook on completion of the call, the direct current loop over the telephone line will be opened at the hook switch, FIG. 3, and the potential across resistor R5, FIG. 1, will disappear, causing transistor Q6, and in turn transistor Q1, to revert to the "off" condition, thus releasing the central office equipment. The diode D17 is inserted in series with transistor Q5 to prevent that transistor from becoming reverse biased on the negative half cycle when ringing potential is applied to the tip of the telephone line. The transistor Q4, FIG. 1, and associated rectifier bridge is connected in series with the ground lead to winding 104 of repeating coil 100 in order to prevent short circuiting of the ringers when ringing potential is applied to the ring side of the telephone line. The rectifier bridges associated with transistors Q2, Q3 and Q4 are for the purpose of ensuring that the emitters of these transistors are always connected towards negative potential and the collectors towards positive potential regardless of the polarity of the potential encountered in the circuit under control.

Instead of employing neon lamps TR and RR as in FIG. 1, filament type lamps FT and FR, in combination with reactance coils CT and CR respectively, may be employed.

The purpose of the reactance coils CT and CR is to prevent voice frequency current from being shunted to ground through the lamp filaments, no appreciable loss will result to the flow of 20 cycle ringing current derived from the central office ringing supply, FIG. 2.

FIG. 1A, which employs a light activated transistor, may be substituted individually for the transistor circuits 106, 107. In this case, light responsive resistors TR1 and RR1 are not required as the light activated rectifier Q7, FIG. 1A, is operated directly by light rays emitted by lamps TR, RR or FT, FR.

What is claimed is:

1. A telephone signalling system comprising in combination:

a central office loop having a tip and ring side, containing
- a first source of ringing current with means to apply the ringing current to the tip and to the ring side of the loop,
- a first and second light source individually connected in the tip and ring side of the loop responsive to the ringing current,
- a first and second winding of a first section of repeating coil having their outer ends individually connected to the tip and ring side of the loop,
- a first transistor connected to the inner ends of the windings, biased to cut-off while ringing potential is applied from the central office, a subscriber's telephone loop having tip and ring sides containing:
- a plurality of subscribers' stations provided with means for divided ringing, a second source of ringing current, a third and fourth winding of the second section of said repeating coil having a coupling capacitor connected to the inner ends of the third and fourth winding, a second and third transistor of opposite conductivity to that of the first transistor, having an individual light responsive resistor connected between the base and collector electrodes, connected to the tip and ring side of the subscriber's telephone loop and to the second ringing source such that the second and third transistors become conductive when the light responsive resistors respond to the respective first and second light source so that the second ringing source is applied to the tip and ring sides of the subscriber's telephone loop.

2. A telephone signalling circuit as defined in claim 1 having in combination therewith:

a repeating circuit interposed between the central office loop and the subscriber's telephone loop consisting of:

a grounded energy source, a fourth transistor of opposite conductivity to that of the first transistor, having a light responsive resistor connected between the base and emitter electrodes, connected between the energy source and the subscriber's telephone loop such that when the light responsive resistor responds to the second light source, the ground of the grounded energy source is removed from the subscriber's telephone loop, a fifth transistor of opposite conductivity to that of the first transistor, having a light responsive resistor connected between the base and emitter electrodes, connected to the subscriber's telephone loop such that the energy source is cut off when the light responsive resistor of such transistor responds to the first light source, a sixth transistor of opposite conductivity to that of the first transistor, included in the said talking loop, means for connecting the output of the transistor to the input of the first transistor so as to bias such transistor to close the central office loop.

3. A telephone signalling arrangement comprising an input loop having means to generate ringing signals, an output loop, and a signal repeating means connected between said input loop and said output loop for repeating said ringing signals, said signal repeating means comprising:

a light source connected to the input loop and energizable in response to the ringing signals from the input loop;

a voltage source connected to the output loop;

a source of ringing current connected to the output loop and transistor switching means operable in response to the light emitted from the light source for removing said voltage source from the output loop and for connecting said source of ringing current thereto.

4. A telephone signalling arrangement as defined in claim 3 wherein said transistor switching means includes a normally conducting transistor connecting said voltage source to the output loop and a normally non-conducting transistor connecting the source of ringing current to the output loop, the transistors being reversible to their opposite conductivities in response to energization of the light source upon application of a ringing signal from the input loop.

5. A telephone signaling arrangement as defined in claim 4 including a light responsive resistor in the biasing circuit of each of said transistors, said resistor being adapted to reverse the conductivity of the respective transistors in response to light emitted from the light source.

6. A telephone signalling arrangement as defined in 4 claim wherein the transistors are light sensitive.

7. A telephone signalling arrangement comprising a central office loop having means to generate ringing signals, a subscriber telephone line, and a signal repeating means connected between said central office and said subscriber telephone line for repeating said ringing signals to said subscriber telephone line, said signal repeating means comprising:

a light source connected to the central office loop and energizable in repsonse to the ringing signals from the central office loop;

a voltage source connected to the subscriber telephone line;

a source of ringing current connected to the subscriber telephone line and transistor switching means operable in response to the light emitted from the light source for removing said voltage source from the subscriber telephone line and for connecting said source or ringing current thereto, said switching means including a normally conducting transistor connecting said voltage source to the subscriber telephone line and a normally non-conducting transistor connecting the source of ringing current to the subscriber telephone line, the transistors being reversible to their opposite conductivities in response to energization of the light source upon application of a ringing signal from the central office loop.

8. A telephone signalling arrangement as defined in claim 7 wherein said normally non-conducting transistor is connected in series with a full wave rectifier circuit so as to maintain a proper polarity across the transistor regardless of the polarity of the ringing current.

9. A telephone signalling arrangement as defined in claim 7 including a light responsive resistor in the biasing circuit of each said transistors, said resistors being adapted to reverse the conductivity of the respective transistors in response to light emitted from the light source.

10. A telephone signalling arrangement as defined in claim 7 wherein the transistors are light sensitive.

11. A telephone signalling arrangement as defined in claim 7 including means for removing the ringing signals from the central office loop when the subscriber answers in response to the ringing signals.

12. A telephone signalling arrangement comprising a central office telephone line having a tip and a ring side and having means to generate ringing signals on each of said sides, a subscriber telephone line having a tip side and a normally grounded ring side, and signal repeating means connected between said central office telephone line and said subscriber telephone line for repeating said ringing signals, said signal repeating means comprising:

a light source connected to each side of the central office telephone line and energizable in response to ringing signals from the respective side;

a voltage source having its terminals connected to the subscriber telephone line;

a source of ringing current having one terminal connected to each side of the subscriber telephone line and the other terminal connected to ground and transistor switching means responsive to the light emitted from any of the light sources for disconnecting both terminals of said voltage source from the subscriber telephone line and responsive to ringing signals from the tip or ring side of the central office telephone line for connecting the source of ringing current to the respective side of the subscriber telephone line.

13. A telephone signalling arrangement as defined in claim 12 wherein said switching means includes a first normally conducting transistor connecting one terminal of said voltage source to the tip side of the subscriber line, a second normally conducting transistor connecting the other terminal of said voltage source to the ring side of said subscriber telephone line, and two normally non-conducting transistors connecting the source of ringing current respectively to the tip side and to the ring side of the subscriber telephone line, the transistors being reversible to their opposite conductivities in response to energization of the light sources.

14. A telephone signalling arrangement as defined in claim 13 including a light responsive resistor in the biasing circuit of each of said transistors, said resistor being adapted to reverse the conductivity of the respective transistors in response to light emitted from the light sources.

15. A telephone signalling arrangement as defined in claim 13 wherein the transistors are light sensitive.

16. A telephone signalling arrangement as defined in claim 13 wherein each of said two normally non-conducting transistors and the second normally conducting transistor is connected in series with a full wave bridge rectifier circuit so as to maintain a proper polarity across the transistors regardless of the potential encountered in the circuit under control.

17. A telephone signalling arrangement as defined in claim 13 including means for removing the ringing signals from the central office telephone line when a subscriber answers in response to the ringing signals.

References Cited by the Examiner

UNITED STATES PATENTS

| | | | |
|---|---|---|---|
| 2,790,088 | 4/1957 | Shive | 307—88.5 |
| 3,050,675 | 8/1962 | Williams | 307—88.5 |
| 3,059,058 | 10/1962 | Abbott | 179—84 |
| 3,061,724 | 10/1962 | Reich | 307—88.5 |
| 3,066,258 | 11/1962 | Van Overbeek et al. | 307—88.5 |
| 3,076,897 | 2/1963 | Skirvin | 340—228 |
| 3,085,227 | 4/1963 | Brown | 307—88.5 |

ROBERT H. ROSE, *Primary Examiner.*

WALTER L. LYNDE, *Examiner.*

H. BOOHER, *Assistant Examiner.*